Feb. 4, 1958      T. HAGENBERG      2,821,811
METHOD OF MANUFACTURING CATHODE-RAY TUBES
Filed April 22, 1954
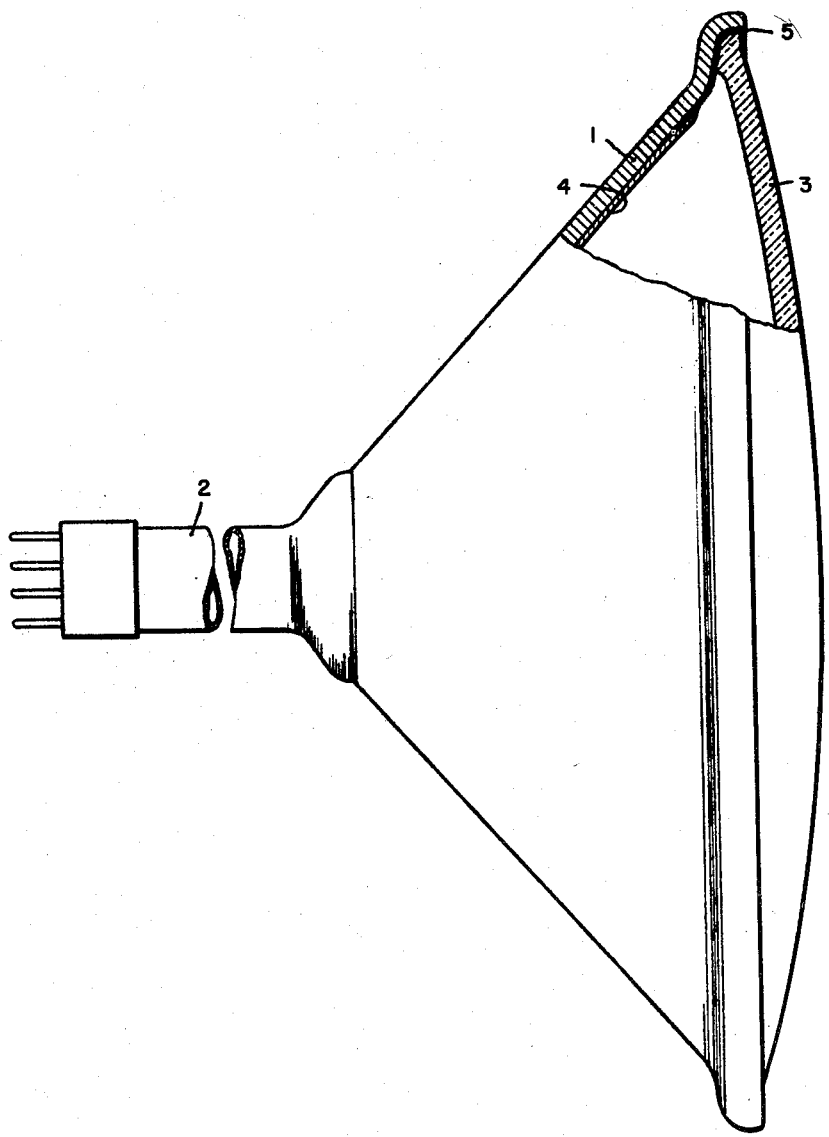
INVENTOR
THEODORUS HAGENBERG
BY *Fred M Vogel*
AGENT

United States Patent Office 2,821,811
Patented Feb. 4, 1958

2,821,811

METHOD OF MANUFACTURING CATHODE-RAY TUBES

Theodorus Hagenberg, Eindhoven, Netherlands, assignor, by mesne assignments, to North American Philips Company, Inc., New York, N. Y., a corporation of Delaware Application April 22, 1954, Serial No. 424,940

Claims priority, application Netherlands May 28, 1953

3 Claims. (Cl. 49—81)

The invention relates to a method of manufacturing cathode ray tubes, more particularly tubes comprising a nickel-plated iron cone to which a glass window is sealed.

In cathode ray tubes comprising an iron cone it is known to apply a nickel layer to at least the inner side of the cone in some cases, to avoid chemical attack of the iron, for example, when the cone is cleaned or the fluorescent screen is applied. The glass window is in this case sealed directly to the nickel-plated iron after the sealing zone has previously been degassed by a heat treatment.

Although in this manner very good results are obtainable, the difficulty arises that, if afterwards the glass window is broken, it is very difficult to re-adapt the cone for sealing-in a new window, for in this case the nickel layer must be completely removed from the sealing zone, after which this zone must again be nickel-plated, which is very cumbersome. In addition, there is always the risk that after the window has been sealed-in, the nickel layer is slightly detached from the iron with resultant air leakages.

The said disadvantages can be completely avoided by using a method of manufacturing a cathode ray tube comprising an iron cone of which at least the sealing zone is nickelplated and to which a glass window is sealed, the sealing zone of the cone being previously subjected to a heat treatment, if in accordance with the invention the sealing zone during the heat treatment is for some time so intensely heated that the nickel layer in loco at least partly forms an alloy with the underlying iron, after which the remaining nickel layer is removed from the sealing zone and the glass window is sealed to the nickel-iron surface.

In this manner the advantage is obtained that no longer any leaking can occur between the nickel and the iron while in the case of repair the sealing zone can be sandblasted several times or be cleaned in a similar mechanical manner without loss of the alloyed layer. In addition, the adherence of the glass to the surface consisting of nickel-iron is much stronger than the adherence to pure nickel.

The invention will now be explained with reference to the following example and the accompanying drawing, showing a cathode ray tube according to the invention.

After very careful cleaning, an iron cone 1 is electrolytically covered with a nickel layer 4, which is 15 microns thick, after which the sealing zone is heated to approximately 1100° C. in air or a nitrogen-hydrogen mixture for a period of time of from 3 to 5 minutes. As a result the nickel 4 is partly diffused into the iron so that between the nickel layer 4 and the underlying iron 1 a transition zone consisting of a nickel-iron alloy 5 is produced.

Thereupon the remaining nickel layer 4 is removed from the sealing zone by chemical or mechanical means and preferably so much of the transition zone is also removed that the surface finally consists of an alloy containing approximately 50% of Ni and 50% of Fe to which glass 3 can be sealed satisfactorily. It is found that in the sealing process no trouble is encountered resulting from liberated gases. The cone is at the narrow end provided with a neck portion 2 containing the electrodes.

Although a single embodiment has been described, it is found that the method according to the invention can also be used in the case of a layer of chromium on iron or of copper on iron. However, these metals are not suitable in the case of cathode-ray tubes, since a chromium layer is not impervious and consequently does not ensure protection of the iron, while the use of copper is inadmissible in view of the formation of spots on the fluorescent screen.

What is claimed is:

1. A method of manufacturing a cathode-ray tube comprising an iron cone having a nickel-plated sealing zone at which a glass window is to be sealed, comprising the steps of intensely heating the sealing zone at a temperature and for a time at which only a portion of the nickel adjacent the iron diffuses therewithin to form an alloy therewith, thereafter removing all of the unalloyed nickel from the sealing zone, and thereafter sealing the glass window to the nickel-iron alloy surface at the sealing zone.

2. A method of manufacturing a cathode-ray tube comprising an iron cone having about a 15 micron thick nickel-plated sealing zone at which a glass window is to be sealed, comprising the steps of intensely heating the sealing zone at about 1100° C. for about 3 to 5 minutes at which only a portion of the nickel adjacent the iron diffuses therewithin to form an alloy therewith, thereafter removing all of the unalloyed nickel from the sealing zone, and thereafter sealing the glass window to the nickel-iron alloy surface at the sealing zone.

3. A method as set forth in claim 2 wherein the removing step includes removing enough of the nickel-iron alloy until the outer surface thereof contains about equal percentages of the nickel and iron.

References Cited in the file of this patent

UNITED STATES PATENTS

| 2,167,431 | Bowie | July 25, 1939 |
| 2,338,538 | Pulfrich | Jan. 4, 1944 |
| 2,480,453 | Dorgelo | Aug. 30, 1949 |
| 2,555,877 | Doran | June 5, 1951 |